Dec. 14, 1965 N. L. DYSTE ETAL 3,222,864
GAS TURBINE ENGINE FIXED BOUNDARY RECUPERATOR
Filed Dec. 31, 1962 2 Sheets-Sheet 1

INVENTORS:
NEAL L. DYSTE,
ERICH W. GELLERSEN,
BY
Attorney.

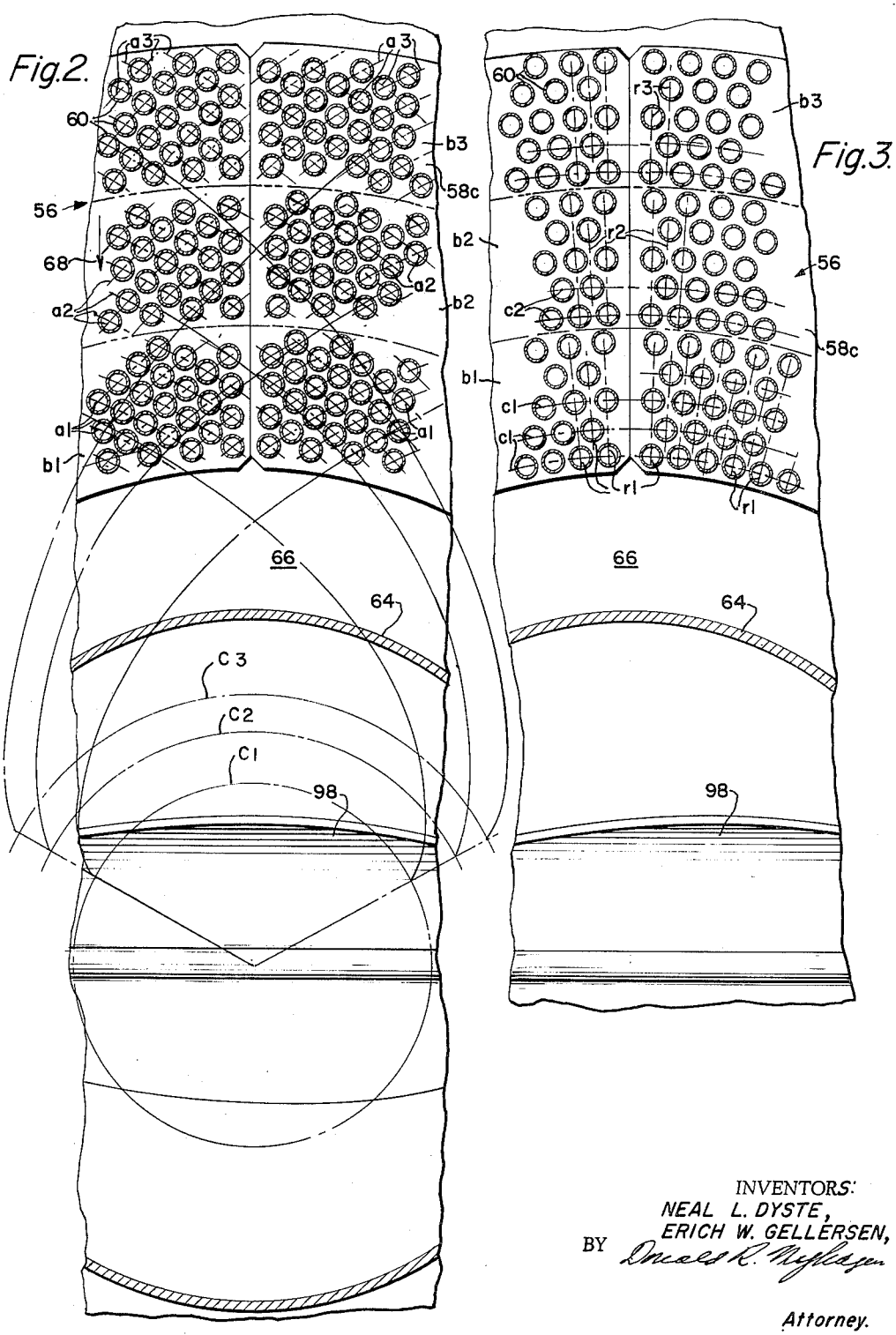

United States Patent Office 3,222,864
Patented Dec. 14, 1965

3,222,864
GAS TURBINE ENGINE FIXED BOUNDARY
RECUPERATOR
Neal L. Dyste, Redondo Beach, and Erich Willi Gellersen, Santa Monica, Calif., assignors to The Garrett Corporation, Los Angeles, Calif., a corporation of California
Filed Dec. 31, 1962, Ser. No. 248,353
5 Claims. (Cl. 60—39.51)

This invention relates generally to gas turbine engines. The invention relates more particularly to an improved recuperated gas turbine engine and to a novel fixed boundary recuperator for use with gas turbine engines and the like.

Gas turbine engines possess many characteristics which are highly desirable in prime movers. Foremost among these are the relative simplicity, reliability, and essentially vibration-free operation of a gas turbine engine. The conventional non-recuperated gas turbine engine, however, has one outstanding deficiency which has deterred its widespread use as a replacement for the more conventional internal combustion engines. This deficiency resides in the relatively high specific fuel consumption of the gas turbine engine.

Thus, it is common practice to compare engines, from the standpoint of specific fuel consumption, with the diesel engine. The specific fuel consumption of the typical diesel engine is generally considered to be on the order of 0.4; lb. per H.P. hr. Some diesel engines, however, have a specific fuel consumption as low as 0.3 per H.P. hr. A conventional non-recuperated gas turbine engine, on the other hand may have a specific fuel consumption as high as 1.0 lb. per H.P. hr. The specific fuel consumption of even the most efficient non-recuperated gas turbine engine will be in the range of 0.6 to 0.7 lb. per H.P. hr.

This relatively high specific fuel consumption of the conventional gas turbine engine can be reduced to a value which compares favorably with the specific fuel consumption of the diesel engine by the use of a waste heat recovery device, that is, a device for preheating the turbine inlet air from the turbine exhaust gases. A gas turbine engine equipped with such a waste heat recovery device, for example, may have a specific fuel consumption as low as 0.4 to 0.5 lb. per H.P. hr.

Waste heat recovery devices for this purpose are commonly known as regenerators and recuperators. Regenerators include periodic flow heat exchangers and continuous flow, rotary heat exchangers. Recuperators include fixed boundary heat exchangers.

A general object of the present invention is to provide an improved recuperated gas turbine engine and an improved recuperator for use with gas turbine engines and the like.

Another object of the invention is to provide an improved recuperator and recuperated gas turbine engine which can be progressively regulated, in a new and unique way, between full recuperative and partially recuperative operation.

Yet another object of the invention is to provide an improved recuperated gas turbine engine wherein the inlet air and exhaust gas passages are arranged in a unique way to minimize undesirable heat loss and maintain minimum temperature at the external surfaces of the engine casing.

A further object of the invention is to provide an improved recuperator of the character described wherein turbine exhaust gas and inlet air flow through the recuperator occur, respectively, through and about a multiplicity of tubular passes or heat transfer tubes which are arranged in a unique pattern that maintains the proper tube spacing throughout the recuperator, thereby maximizing heat transfer and minimizing pressure drop in the recuperator.

Yet a further object of the invention is to provide an improved recuperator of the character described wherein the heat transfer tubes are dimpled in a unique way which has the twofold effect of creating turbulence in the flow through the tubes, thereby to increase the heat transfer coefficient within the tubes, and reinforcing the tubes against collapse by the external pressure thereon, thereby to achieve a relatively light weight, compact recuperator with less engine overhang.

Other objects, advantages, and features of the invention will present themselves to those skilled in the art as the description proceeds.

Briefly, the objects of the invention are attained by providing a gas turbine engine-recuperator combination wherein the recuperator comprises an annular heat exchanger coaxially positioned in the exhaust end of the turbine engine casing and through which the turbine inlet air and turbine exhaust gases flow. The heat exchanger is composed of a bundle of heat transfer tubes arranged about a central exhaust by-pass opening through the recuperator, the walls of which tubes separate, but permit heat transfer between, the exhaust gases and the inlet air. Within the central recuperator opening is a valve for regulating exhaust gas flow through the opening. When the by-pass valve is closed, the entire exhaust gas flow from the turbine occurs through the recuperator proper to preheat the turbine inlet air. When the valve is full open, a portion of the exhaust gases exhaust directly to atmosphere through the central by-pass opening of the recuperator, thereby producing minimal preheating of the turbine inlet air. Thus the degree of waste heat recovery, i.e. recuperation, effected by the recuperator may be regulated during starting of the turbine and subsequent variations in the turbine load by adjustment of the by-pass valve.

The heat transfer tubes of the presently illustrated recuperator convey the exhaust gases and are supported at intervals by annular baffles which define therebetween a flow path for the turbine inlet air about the outside of the tubes, whereby the air enters the recuperator radially at its downstream end, flows radially in toward the axis of the recuperator and over the heat transfer tubes therein, then parallel to said axis, and finally radially out toward the circumference of the recuperator at its upstream end, again over the heat transfer tubes. This air flow, which occurs throughout a complete 360° of the recuperator, thus provides a counterflow heat exchanger.

Inlet air is delivered to the recuperator inlet, from an air inlet at the leading end of the engine casing, via an annular flow passage, the outer wall of which is formed by the outer wall of the turbine casing. The preheated inlet air discharging from the recuperator is returned forwardly through the turbine casing to the inlet of the engine turbine via a second annular passage, the outer wall of which is formed by the inner wall of the outer annular inlet air passage. In this way, both undesirable heat loss and the temperature of the outer casing wall are minimized.

The heat transfer tubes of the illustrated recuperator are arranged in a unique pattern which provides an optimum uniform tube spacing, whereby heat transfer in the recuperator is improved and the pressure drop is minimized. The tubes are also dimpled circumeferentially to reinforce them against inward collapse by the external air pressure thereon and to promote turbulent exhaust gas flow therethrough, thereby increasing the heat transfer coefficient within the tubes.

A presently preferred embodiment of the invention will now be described by reference to the attached drawings wherein:

FIG. 2 is an enlarged partial section taken on line 2—2 in FIG. 1;

FIG. 3 is a section similar to FIG. 2 but illustrating an alternative recuperator tube pattern.

Figure 1:
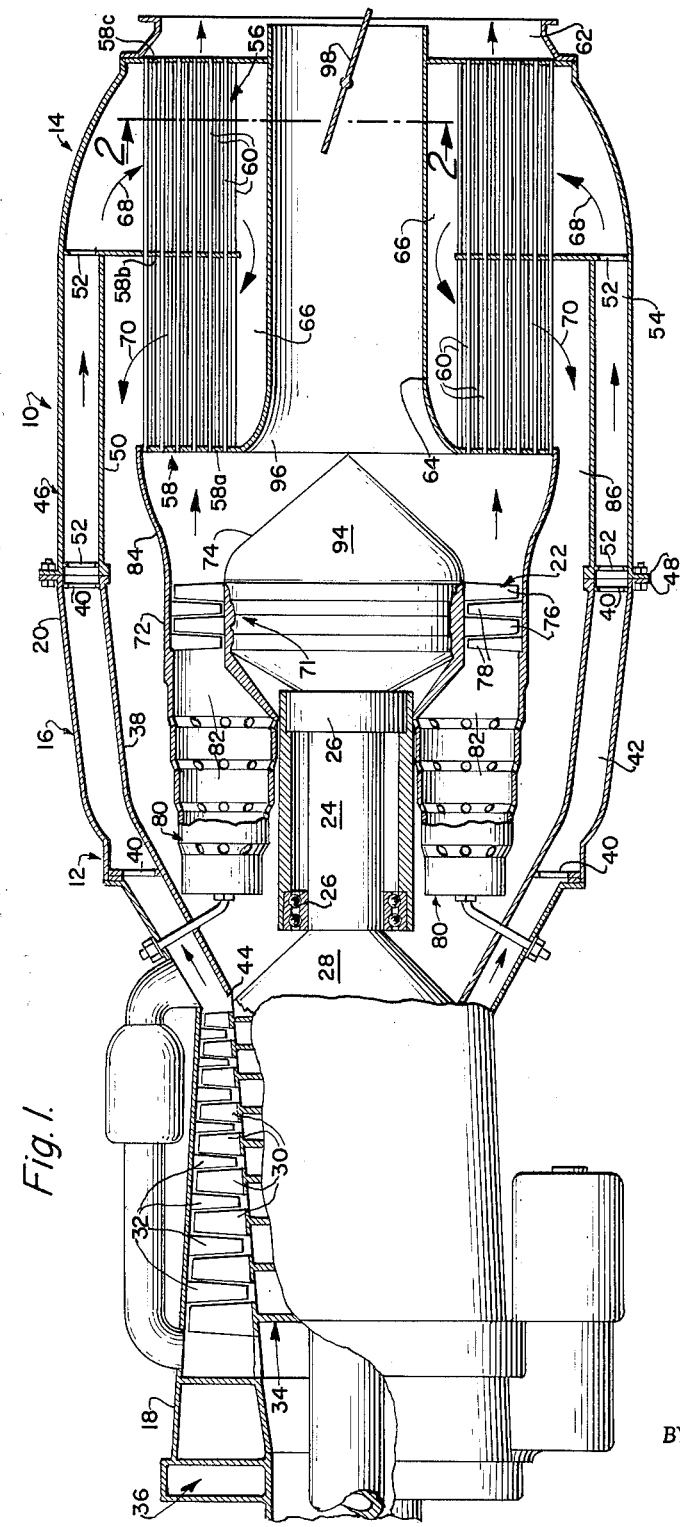
FIG. 1 is a semi-diagrammatic illustration, in axial section, of a typical recuperated gas turbine engine according to the invention.
Figure 4:
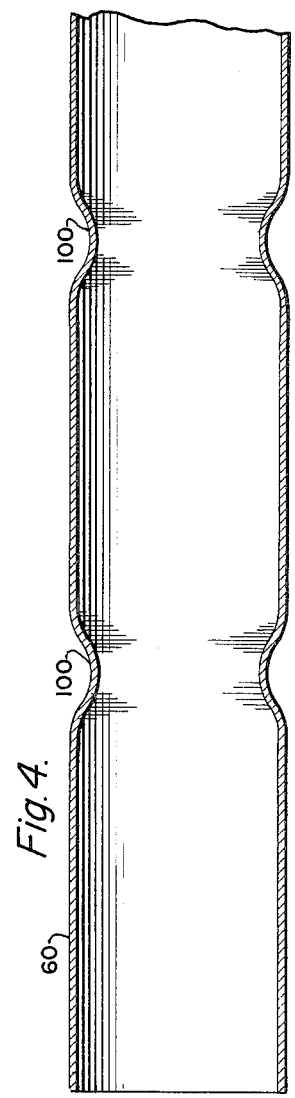
FIG. 4 is an enlargement of one of the recuperator heat transfer tubes.

In these drawings, numeral 10 denotes the present gas turbine engine-recuperator combination, and numerals 12 and 14 denote the gas turbine engine and the recuperator, respectively, of this combination. Referring first to the gas turbine engine 12, the latter comprises an outer annular casing 16 having a reduced and forwardly flared inlet end 18 and an enlarged exhaust end 20.

The power unit 22 of the gas turbine engine is coaxially mounted within the casing 16. This power unit is of generally conventional design and includes a rotor 24 which is rotatably supported, in the usual way, by bearings 26. On the forward end of the rotor is a tapered hub 28 mounting compressor blades 30 which cooperate with stantionary compressor blades 32 on the casing 16 to form a turbocompressor 34. Air entering the turbine casing 16 through the forward axial inlet opening 36 thereof thus flows rearwardly through and is compressed within the turbocompressor 34.

Concentrically disposed within the turbine engine casing 16 to the rear of the turbocompressor 34 is an annular wall 38. Wall 38 is supported from the wall of the outer casing 16 by apertured baffles 40 and is spaced radially inward from the casing wall to define therewith an annular passage 42. The forward end of the wall 38 tapers inwardly toward the axis of the turbine rotor 24 to terminate in a circular edge 44 situated in close proximity to the rotor hub 28. The hub, then, protrudes through the circular opening defined by the wall edge 44. The compressed inlet air emerging from the turbocompressor 34, therefore, enters the annular passage 42 to flow rearwardly therethrough in contact with the outer casing wall 16.

Recuperator 14 comprises an outer annular casing 46, the forward end of which is the same diameter as the rear end of the engine casing 16. These casing ends have transverse circumferential flanges 48 which abut one another and are joined by bolts, as shown. Concentrically disposed within the recuperator casing is an annular wall 50, the forward end of which is the same diameter as, and abuts, the rear end of the engine casing inner wall 38. The inner recuperator wall 50 is supported from the outer recuperator casing 46 by apertured annular baffles 52. The rear end of the recuperator inner wall 50 terminates approximately midway between the ends of the recuperator casing 46. Wall 50 is spaced inwardly from the recuperator casing 46 to define therebetween an annular inlet air passage 54 communicating with the annular inlet air passage 42 in the turbine engine casing 16. Accordingly, the compressed inlet air emerging from the latter passage enters the annular recuperator passage 54 and flows rearwardly therethrough to the rear end of the inner recuperator wall 50. The air then enters the heat exchanger 56 of the recuperator.

Heat exchanger 56 has an annular configuration and is concentrically mounted within the after end of the recuperator casing 46. This heat exchanger comprises a series of annular baffles 58 disposed in planes normal to the axis of the heat exchanger and including a forward baffle 58a, a center baffle 58b and a rear baffle 58c. Extending through aligned holes in and secured to these baffles are a bundle of heat transfer tubes 60. Tubes 60 parallel the recuperator axis. The interior passages in the heat exchanger tubes open at their forward ends through the forward exchanger baffle 58a at their rear ends through the rear baffle 58c. As will be seen shortly, exhaust gas from the power unit 22 flows through the tubes 60 to an exhaust opening 62 in the rear end of the recuperator casing 46. Heat exchanger baffles 58 may comprise separate segments, as shown, or complete rings.

Within the central coaxial openings in the heat exchanger baffles 58 is a sleeve 64. The forward and rear ends of this sleeve are joined to the inner edges of the forward baffle 58a and the rear baffle 58c, respectively. Between its ends, the sleeve 64 is inwardly spaced from the inner edge of the center baffle 58b to define an annular flow passage 66 between the sleeve and the innermost heat exchanger tubes 60.

The center baffle 58b and rear baffle 58c define therebetween an annular flow space 68 about the outside of the heat exchanger tubes 60 and extending through a full 360° of the heat exchanger. The forward baffle 58a and center baffle 58b define therebetween a second annular flow space 70 about the outside of the heat exchanger tubes and extending through a full 360° of the heat exchanger. These flow spaces open through the outer perimeter of the heat exchanger and to the inner annular flow passage 66 in the heat exchanger.

The outer edge of the rear heat exchanger baffle 58c is secured to the recuperator casing 46 about the exhaust opening 62 in the latter casing. Center baffle 58b of the heat exchanger 56 is somewhat larger in external diameter than the outermost circumeferential row of heat exchanger tubes 60, whereby the outer edge portion of the latter baffle projects radially beyond the outermost tube row. The rear edge of the inner annular recuperator wall 50 is secured to the outer projecting edge of the center heat exchanger baffle, as shown.

Accordingly, the compressed inlet air emerging from the rear end of the annular recuperator inlet air passage 54 enters the rear heat exchanger flow space 68, at, and about the entire outer perimeter of the heat exchanger 56 and flows through said space radially in toward the axis of the heat exchanger and over the outside of the heat exchanger tubes 60. The inlet air then flows forwardly through the inner annular passage 66 of the exchanger and finally radially out to the outer perimeter of the heat exchanger through the forward flow space 70 thereof, again over the outside of the heat exchanger tubes.

Power unit 22 includes, in addition to the structure thus far described, a turbine 71 including a turbine housing 72 about the rear end of the engine rotor 24. Within this housing is an impeller 74 which is fixed to the rotor and has blades 76 about its periphery for cooperation with fixed blades 78 on the turbine casing. Extending forwardly from the turbine housing 72, parallel to the turbine axis, are a series of generally cylindrical barrels 80 each having an internal combustion chamber 82. These chambers open to the interior of the turbine housing 72, whereby the hot gases issuing from the several combustion chambers flow axially through the housing to drive the impeller 74 and, thereby, the turbocompressor 34, the gases exhausting rearwardly from the turbine housing through a rear exhaust diffuser 84 on the housing. The forward heat exchanger baffle 58a is joined to the rear end of the diffuser 84.

The inlet air emerging from the forward flow space 70 of the heat exchanger 56 flows forwardly through the annular passage 86 about the power unit 22 and enters the combustion barrels 80 through openings in the walls thereof. Within each combustion chamber 82 is a nozzle (not shown) through which fuel is discharged to mix with air in the chamber. The fuel-air mixture is ignited by an igniter (not shown) in each combustion chamber to create the hot propulsion gases which drive the turbine 71. Projecting rearwardly from turbine 71 is a diffuser cone 94 which may form part of the turbine housing 72 or comprise part of a hub on the turbine rotor 24.

It will be seen that two alternate flow paths are provided for the hot gases exhausting from the turbine 71. One of these flow paths is through the tubes 60 of the heat exchanger 56. The other flow path is through the central opening 96 in the inner heat exchanger sleeve 64. Exhaust gas flow through the latter passage is regulated by valve means 98 which may be of any type suitable for this purpose. For simplicity, valve means 98 has been illustrated as comprising a simple butterfly valve. The shaft of valve 98 may be drivably coupled to a reversible motor (not shown) adapted to be controlled from any remote location, whereby the valve 98 can be adjusted to any desired setting between its fully closed and its fully open positions to regulate the exhaust gas flow through the central heat exchanger passage 96.

During operation of the gas turbine engine-recuperator unit thus far described, air enters the unit through the forward inlet 36 and is compressed during its axial flow through the turbocompressor 34, the latter being driven, of course by the gas turbine 71. The compressed inlet air then flows rearwardly through the outer annular inlet passages 42 and 54 to the rear peripheral inlet of the recuperator heat exchanger 56. Air flow through the heat exchanger is radially inward through the rear exchanger flow space 68, then forwardly through inner annular passage 66 of the exchanger, and finally radially outward through the forward exchanger flow space 70. During its passage through the exchanger, the air flows over the outside of the heat transfer tubes 60 in the exchanger. The inlet air then flows forwardly through the inner annular inlet air passage 86 to the gas turbine 71.

Assuming, for the moment that the recuperator valve 98 is closed, the hot exhaust gases emerging from the turbine 71 flow through the heat exchanger tubes 60 to the rear exhaust opening 62. The compressed inlet air flowing to the turbine 71 through the heat exchanger 56 and over the outside of the tubes 60 is thereby preheated by the turbine exhaust gases. This results in a substantial reduction in the specific fuel consumption of the power unit 22, as explained earlier.

According to the preferred practice of the invention, the heat exchanger tubes 60 are circumferentially dimpled, as shown at 100, to create turbulence in the exhaust gases flowing through the tubes. This turbulence increases the heat transfer coefficient in the tubes, thereby increasing the heat transfer from the exhaust gases to the inlet air and, accordingly, further decreasing the specific fuel consumption of the power unit 22.

Heat transfer from the exhaust gases to the inlet air is maximized, and the pressure drop in the inlet air during its passage through the heat exchanger 56 is minimized by arranging the heat transfer tubes 60 in an optimum staggered pattern which is generally uniform relative to the radial direction of air flow through the heat exchanger about the entire circumferential extent of the exchanger, and wherein the diagonal tube spacing, that is, the center distance between each tube and its four diagonally adjacent tubes in the two adjacent tube rows, is generally uniform throughout the tube array and substantially equal to the optimum tube spacing for maximum heat transfer and minimum pressure drop. Such uniform optimum diagonal tube spacing is important since it results in maximum exchanger efficiency and minimum pressure drop through the exchanger. In the present tube pattern, or array, the tubes are located in concentric circular rows centered on the axis of the heat exchanger, and along radials passing through and uniformly angularly spaced about the heat exchanger axis, all in such manner that the tubes in alternate rows are situated on the same alternate radials, the tubes in the intervening rows are situated on the intervening radials, and the center distances between adjacent tubes on adjacent radials are substantially uniform throughout the tube array.

FIGS. 2 and 3 illustrate two geometric methods according to the invention for locating the tube centers to achieve such an optimum tube pattern and spacing. In FIG. 2, the heat exchanger tubes are located at the intersection of a series of oppositely spiralling involutes. For reasons which will be explained shortly, the tubes are arranged in concentric annular bands, identified as $b1$, $b2$ and $b3$ in FIG. 2, and the involutes which define the tube locations in the successively larger diameter bands are generated about different base circles of successively larger diameter. In FIG. 2, the reference characters $c1$, $c2$ and $c3$ designate the base circles for the involutes which define the tube locations in the bands $b1$, $b2$ and $b3$, respectively, and the reference characters $a1$, $a2$ and $a3$ designate the involutes of the bands, respectively.

According to the invention, the base circle for each band of tubes is divided into an equal of points, oppositely spiralling involutes are generated from each point of the respective base circle, and the tubes in the respective band are located at the intersections of the respective involutes.

It will be immediately apparent to those skilled in the art, both from a geometrical analysis and from an inspection of FIG. 2, that the foregoing method of tube location produces the optimum staggered tube pattern described earlier. In other words, the tubes are arranged in a series of concentric circular rows centered on the heat exchanger axis. The tubes in each row are located on alternate uniformly angularly spaced radials passing through the axis. The tubes in alternate rows are located on the same alternate radials and the tubes in the intervening rows are located on the interventing radials, whereby the tubes in adjacent rows are staggered. Finally, since the involutes generated in each direction about each base circle are spaced a constant distance throughout their length, the diagonal tube spacing, that is, the distance between adjacent intersections along each involute and, therefore, the center distance between diagonally adjacent tubes, is generally uniform within each of the relatively narrow tube bands $b1$, $b2$, $b3$.

The intersection spacing along each involute, and thereby the diagonal tube spacing, while being relatively uniform in each band, does progressively increase outwardly along each involute. On the other hand, the spacing between adjacent involute intersections, and hence tubes, along each radial progressively diminishes outwardly along each radial. Accordingly, to preserve a proper tube spacing throughout the tube pattern, it is necessary to separate the tube area into bands and to use a proportionally larger base circle for the involutes of each larger tube band, each circle being divided into the proper number of increments to yield the desired tube spacing. It is apparent that since the tube spacing varies slightly in each band, the present method of tube location will yield an exact desired tube spacing only at one radial distance from the heat exchanger axis. This radial distance is preferably selected to correspond to the center of the respective band.

The heat exchanger tubes 60 in FIG. 3 are arranged in the same basic staggered tube pattern as the tubes in FIG. 2. Thus, in FIG. 3, the tubes are arranged in circular rows centered on the heat exchanger axis and along alternate radials passing through and uniformly spaced about the exchanger axis, all in such manner that the tubes in alternate rows are located on the same radials and the tubes in the intervening rows are located along the intervening radials. Each tube in the tube pattern or array has four diagonally adjacent tubes located in the two adjacent tube rows, as before.

As discussed earlier in connection with FIG. 2, it is desirable to maintain a generally uniform diagonal tube spacing, i.e., center distance between diagonally adjacent tubes, throughout the tube array in order to attain high heat exchanger efficiency and low pressure drop through the exchanger.

In FIG. 3, the circular tube rows are designated by the reference characters $c1$, $c2$ and $c3$ and the radials on which the tubes are located are designated by the reference characters $r1$, $r2$, $r3$. The tubes are arranged in annular bands $b1$, $b2$, $b3$, as in FIG. 2.

In FIG. 3, the optimum tube pattern discussed above is attained, generally speaking, by first laying out the radials so that they pass through and are uniformly spaced about the heat exchanger axis, then constructing curves or arcs which intersect alternate radials at points located in concentric circular rows centered on the exchanger axis in such manner that the intersection points in alternate rows are located on the same alternate radials, the intersection points in the intervening rows are located on the intervening radials, and the diagonal spacing between diagonally adjacent points of intersection in adjacent rows is generally uniform throughout the tube area, and finally locating the heat exchanger tubes at such points of intersection. In FIG. 3, the curves or arcs which intersect the radials to define the locations for the heat exchanger tubes are uniformly radially spaced circles centered on the heat exchanger axis.

It will be immediately apparent to those skilled in the art that the use of equally radially spaced circles to define the tube locations, as discussed above, results in a progressive gradual increase in the diagonal tube spacing outwardly along the radials due to the progressive increase in the spacing between adjacent tubes in each circular tube row which occurs as the tube rows increase in diameter. A constant diagonal tube spacing may obviously be obtained if, in lieu of defining the tube locations in each tube row by intersecting the radials by concentric circles, the intersection points of the smallest diameter circle with alternate radials are first established to locate the tubes in the first or smallest diameter tube row, and then arcs, equal in radius to the desired diagonal tube spacing, are struck from each intersection point in the first row so as to intersect the intervening radials, thereby to establish the tube locations in the second row. This procedure is then repeated for each successive tube row.

In FIG. 3, the angular spacing between radials is reduced in each of the successive tube bands $b1$ and $b2$ in order to maintain a more constant spacing between tubes in the circular tube rows. In both FIGS. 2 and 3, the tube bands have been shown to be of the same radial extent. The tube bands could progressively decrease in radial dimension as the bands increase in diameter, however, in order to maintain the same range of variation in tube spacing in all bands.

After the desired heat exchanger tube spacing and pattern are determined, the heat exchanger baffles may be formed, for example, by drilling them with an automatic drilling machine.

The purpose of the recuperator valve 98 is to permit the turbine exhaust gases to by-pass the heat exchanger for partially recuperative operation of the gas turbine power unit 22. Thus, if the recuperator valve 98 is rotated to its full open position, a portion of the turbine exhaust gases will flow directly to the exhaust opening 62 through the central heat exchanger passage 96, rather than through the tubes 60 of the heat exchanger 56, because of the increased resistance to gas flow through the tubes as compared with the resistance to gas flow through the central exhaust passage 96. Some exhaust gases will, of course, continue to flow through the heat exchanger tubes. Closing of the valve 98 progressively reduces the exhaust gas flow through the central exhaust passage 96 and increases the gas flow through the heat exchanger tubes 60. Thus, the degree of recuperation may be regulated by appropriately controlling the valve 98, as required to achieve the proper inlet air temperature to the turbine during starting of the latter and maximum efficiency during subsequent operation of the turbine, especially during changes in the turbine load. Conceivably, this valve could be controlled automatically.

It is evident to those skilled in the art that the heat exchanger configuration disclosed herein may find useful application in devices other than the illustrated gas turbine engine. Accordingly, the heat exchanger should not be regarded as limited to use with such an engine.

Obviously numerous modifications in the design, arrangement of parts, and instrumentalities of the invention are possible within the spirit and scope.

We claim:
1. A gas turbine engine comprising:
   an elongate casing having an air inlet at one end and an exhaust opening at the other end;
   a gas turbine power unit within said casing and having an exhaust passage communicating with said exhaust opening and further having an air intake;
   a wall within said casing about said power unit and spaced inwardly from said casing to define with the latter a generally annular air inlet passage communicating at one end with said air inlet of said casing and at the other end with said air intake of said power unit,
   said inlet passage encircling said power unit and extending substantially the full length of said casing in direct heat transfer relation to the casing, whereby inlet air flowing through said inlet passage cools said casing;
   a heat exchanger within said other end of said casing having first passage means and second passage means through which said exhaust passage of said power unit communicates with said exhaust opening, and third passage means through said said other end of said annular inlet passage communicates with said air intake of said power unit,
   said first passage means and said third passage means being disposed in heat transfer relation, whereby the inlet air entering said power unit is preheated by exhaust gases flowing through said first passage means; and
   means for proportioning exhaust gas flow from said power unit through said first and second passage means, thereby to regulate preheating of the inlet air entering said power unit.

2. A gas turbine engine according to claim 1 in which said proportioning means comprises a valve in said second passage means.

3. A recuperator for gas turbine engines and the like, comprising:
   three annular coaxial baffles;
   a multiplicity of heat transfer tubes supported in said baffles in parallel relationship to and dispersed about the common axis of the baffles;
   the center baffle being located approximately midway between the ends of said tubes and the two outer baffles being located at the ends, respectively, of the tubes;
   the interior passages in said tubes opening through the outer baffles;
   a sleeve positioned within the central coaxial openings in said baffles and having a central exhaust opening therethrough;
   said sleeve being joined about its ends to the inner edges of the two outer baffles and spaced from the inner edge of the inner baffle;
   said sleeve and baffles defining therebetween a flow space through the heat exchanger about the outside of said tubes and opening at its ends through the periphery of the heat exchanger, said flow space extending radially in toward the axis of the heat exchanger between said center baffle and one outer baffle, then axially of the heat exchanger between said sleeve and the inner edge of said center baffle, and finally radially out to the periphery of the heat exchanger between said center baffle and the other outer baffle; and valve means within the passage through said sleeve for selectively opening and closing the latter passage.

4. A gas turbine engine comprising:

an elongate casing having an air inlet at one end and an axial exhaust opening at the other end;

a gas turbine power unit concentrically mounted within said casing and having an exhaust passage opening axially toward said other end of said casing and further having an air intake;

a heat exchanger concentrically mounted within said other end of said casing between said power unit and said exhaust opening of said casing, said heat exchanger including first passage means and second passage means communicating said exhaust passage of said power unit to said exhaust opening of said casing, and third passage means communicating said inlet of said casing to said air intake of said power unit, said first and third passage means being disposed in heat transfer relation, whereby the inlet air entering said power unit is preheated by exhaust gases from said power unit; and means for proportioning exhaust gas flow through said first and second passage means to regulate preheating of said inlet air.

5. A gas turbine engine according to claim 4 wherein:

said second passage means is a central passage directly communicating said exhaust passage of said power unit to said exhaust opening in said casing, and said proportioning means is a valve in said central passage for regulating exhaust gas flow through said central passage.

References Cited by the Examiner

UNITED STATES PATENTS

| | | | |
|---|---|---|---|
| 1,722,109 | 7/1929 | Potter | 165—160 |
| 1,856,618 | 5/1932 | Brown | 165—175 |
| 2,021,856 | 11/1935 | Forbes | 165—172 X |
| 2,162,956 | 6/1939 | Lysholm | 60—35.6 |
| 2,556,186 | 6/1951 | Hegenbrath | 165—146 |
| 2,591,540 | 4/1952 | Grylls | 60—39.51 |
| 2,604,277 | 7/1952 | Anxionnaz | 60—35.6 |
| 2,609,659 | 10/1952 | Price | 60—39.51 |
| 2,641,324 | 6/1953 | Fortescue | 60—35.6 |
| 2,655,350 | 10/1953 | Gaylord | 165—160 |
| 2,713,245 | 7/1955 | Weaving | 60—39.51 |
| 2,864,588 | 12/1958 | Booth et al. | 165—133 |
| 2,880,972 | 4/1959 | Williams | 60—39.51 |

DONLEY J. STOCKING, *Primary Examiner.*

ABRAM BLUM, SAMUEL LEVINE, *Examiners.*